United States Patent [19]

Reichgott et al.

[11] Patent Number: 4,496,667

[45] Date of Patent: Jan. 29, 1985

[54] METHOD FOR CLEANING ORGANICALLY FOULED ANION EXCHANGE RESINS

[75] Inventors: David W. Reichgott; Michael J. Leary, both of Richboro, Pa.

[73] Assignee: Betz Laboratories, Inc., Trevose, Pa.

[21] Appl. No.: 523,246

[22] Filed: Aug. 15, 1983

[51] Int. Cl.$^3$ .............................. C08D 5/20; B01J 1/09
[52] U.S. Cl. ...................................... 521/26
[58] Field of Search .......................................... 521/26

[56] References Cited

U.S. PATENT DOCUMENTS 2,718,489  9/1955  Coonradt et al. .................... 521/26

FOREIGN PATENT DOCUMENTS 527521  7/1956  Canada .................................. 521/26

Primary Examiner—Joseph L. Schofer
Assistant Examiner—Peter F. Kulkosky
Attorney, Agent, or Firm—Alexander D. Ricci; Bruce E. Peacock

[57] ABSTRACT

Methods for cleaning organically fouled anion exchange resins are disclosed. In addition to cleaning with brine and/or caustic, the fouled resins are contacted with an aqueous solution comprising an effective cleaning agent having the formula R—O—H wherein R is alkyl ($C_1$-$C_4$) or hydroxylated alkyl ($C_1$-$C_4$). Isopropanol is preferred.

6 Claims, No Drawings

METHOD FOR CLEANING ORGANICALLY FOULED ANION EXCHANGE RESINS

FIELD OF INVENTION

The present invention pertains to an improved method for cleaning organically fouled anion exchange resins by the use of an alcoholic cleaning agent in combination with the heretofore traditional use of brine and/or caustic cleaning solutions.

BACKGROUND

The fouling of anion resins has posed a problem that has confronted ion exchange applications since their inception. Humic substances found in surface waters are high molecular weight polyfunctional organic acids (both carboxylic and phenolic) formed from the breakdown of plant and animal materials. In demineralizer operations, the large organic molecules may coat the resin bead, blocking and/or entering the pores of an anion exchange resin. These organics are retained because of a high affinity for the exchange sites and hydrophobic interactions with the polymer backbone of the resin.

Since the diffusion rates of the organics within the resin are usually slower than those of inorganic ions, not all of the bonds linking the organic acids to the resin are broken during the regeneration cycle. This situation results in only partial regeneration of the resin and excessive rinse times following regeneration. In severe cases, the resin may become "irreversibly" fouled. To alleviate these problems, out-of-service brine or brine/caustic cleaning has traditionally been performed. It has also been suggested that sodium hypochlorite may also be used as such a cleaning treatment. However, resin degradation may occur with the use of such a strong oxidizing agent.

U.S. Pat. No. 3,748,285 (Wiltsey, et. al.) is directed toward compositions and methods for cleaning ion exchange resins. The cleaning composition comprises (a) from 60-90% water, (b) from about 0.5-4% of an unsubstituted, liquid aliphatic hydrocarbon having from 5 to 10 carbon atoms, and (c) from about 0-10% of a wetting agent selected from the group consisting of sulfated alcohols and sulfonated hydrocarbons and having of from 6 to 22 carbon atoms. In addition, an organic compound (d) having the formula $$R(OCH_2CH_2)_xOR$$

is also made part of the treatment. In accordance with the disclosed formula, R is independently selected from the group consisting of H, lower aliphatic radicals of from 1-6 carbon atoms and radicals having the formula

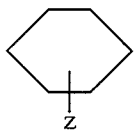

where Z is selected from the group consisting of H and aliphatic hydrocarbon radicals of from 4 to 18 carbon atoms and x is an integer of from about 1 to 20. As to specific (d) compounds disclosed, glycol butyl ether and ethoxylated alkyl phenols are preferred. The gist of the reference is directed toward cationic exchange resins in contrast to the present invention which is directed toward anion exchange resins. Moreover, Wiltsey, et al., is concerned with cleansing of hydrocarbon oils from the resins. In contrast, the present invention provides a means for cleansing naturally occurring foulants such as humic acids, lignins, tannins, etc., from anionic exchange resins. As shown hereinafter, several of the ethoxylated alkyl phenol compounds have been tested as anionic resin cleaning agents and have proven only marginally effective. Moreover, these ethoxylated alkyl phenols are notorious in their propensity to foam, thus causing severe problems if any leak to the boiler.

Other patents which may be noted of interest include U.S. Pat. Nos. 4,153,761 (Marsh) and 3,536,637 (Noll, et. al.).

Accordingly, there remains a need in the art for resin cleaning materials which may effectively cleanse organic foulants from anionic exchange resins without resulting in resin degradation and/or severe foaming problems. These needs are effectively met by utilization of the resin cleaning methods of the present invention.

DETAILED DESCRIPTION OF THE INVENTION

We have surprisingly found that organic foulants are effectively cleaned from anionic exchange resins when these resins are contacted with an aqueous alcoholic solution in combination with the traditional brine and/or caustic washing. Basically, the treatment comprises the off-line washing of the organically fouled anionic exchange resin by an aqueous solution comprising about 0.1-50% (wt) of an alcoholic compound having the formula R—O—H wherein R is alkyl ($C_1$-$C_4$) or hydroxylated alkyl ($C_1$-$C_4$), about 1-2% caustic, and from about 0-20% brine.

Exemplary alcoholic cleaning compounds comprise ethylene glycol, isopropanol, methanol and ethanol. Isopropanol is preferred.

The resin cleaning agents of the invention may be used in the cleansing of strong base anion exchange resins, or weak base anion exchange resins.

EXAMPLES

The invention will now be further described with reference to a number of specific examples which are to be regarded solely as illustrative and not as restricting the scope of the invention.

In order to demonstrate the efficacy of the resin cleaning agents in accordance with the invention, effluent from a treated resin was analyzed to ascertain the Total Organic Carbon (TOC) content thereof. Samples treated in accordance with the invention were compared to control values. TOC content higher than control values indicates efficacy of the cleaning agents.

In order to determine the TOC values for cleaned (treated) resins, a spectrophotometric method utilizing Beer's law and a Bausch and Lomb Spectronic 20 instrument was devised. Since the cleaning agents (which themselves contain organic carbon) were tested as adjuncts to brine/caustic solutions, the caustic and/or brine-caustic effluent from the cleaned resin (no cleaning agents of the present invention added) was analyzed for TOC by a Combustion/IR Spectroscopy method in which all of the organic carbon found in the effluent is first converted to $CO_2$ which is then detected by IR analysis. Then, absorbance measurements on dilutions of the known TOC samples were made at several wavelengths, resulting in an absorbance vs. concentration (TOC) reference curves. Absorbance measurements on effluent solutions from resin samples cleaned with the resin cleaning agents of the present invention were made, and the TOC values for each effluent were determined from the reference curves.

Table I hereinbelow gives the results for materials evaluated as cleaning agents in demineralized water three-hour static soak tests in combination with caustic and brine.

TABLE I

Evaluation of Cleaning Agents Under Static Soak Conditions

Procedure—50 grams of a drained, strong base anion fouled resin were placed in a 600 ml beaker. Each tested cleaning solution comprised a 1% (wt) concentration of the cleaning agent along with 10% NaCl and 1% NaOH (unless otherwise noted) in demineralized water. The thus treated resins were agitated and then allowed to stand at room temperature over a three-hour period. The TOC of the resulting effluents was then determined in accordance with the spectrophotometric method outlined above.

| Treatment | TOC (ppm) |
|---|---|
| Brine-caustic control | 2,220 |
| Ethoxylated poly ether (Pluronic F-108) | 2,240 |
| Ethoxylated nonyl phenol (Surfonic N-95) | 2,240 |
| Ethoxylated phenol phosphate ester (Triton QS 44) | 1,340 |
| Alkyl sulfosuccinate | 1,840 |
| Ethoxylated octyl phenol (Triton X-100) | 1,980 |
| Alkyl naphthalene sulfonate (Tamol SN) | 1,340 |
| Ethoxylated poly ether (Pluronic L62) | 1,700 |
| Ethylene glycol | 2,020 |
| Brine-caustic control | 2,860 |
| 10% ethylene glycol | 3,240 |

Table II lists the results corresponding to the use of varying concentrations of the resin cleaning agents of the present invention in brine-caustic beaker test. A definite increase in color intensity of the effluent from treated resins was noticed in each instance.

TABLE II

Strong Base Anion Exchange Resin

Procedure—Basically the same procedure used in conjunction with the Table I examples was used. Varying concentrations of the resin cleaning agents were used and are reported in the table. As per Table I, a 10% (wt) NaCl and 1% NaOH control solution was used as a basis for comparison. In each instance, a one-hour soak cycle preconditioning step with brine-caustic cleaning was first performed. The resin sample was then rinsed two times with demineralized H₂O. The resin cleaning agents of the invention were then added (caustic and brine addition also being made) and the resin sample was subjected to another one-hour soak cycle. The resin was then cleaned with demineralized water prior to immersion into the cleaning solution again for a third one-hour soak cycle. TOC values were determined by the spectrophotometric method outlined above.

| Treatment | Test Conditions | TOC (ppm) | % Increase In Efficacy |
|---|---|---|---|
| Resin A | | | |
| Brine-caustic control | 2nd 1 hr. Soak Cycle | 890 | |
| Brine-caustic - 30% Isopropanol | 2nd 1 hr. Soak Cycle | 1,700 | 100 |
| Brine-caustic control | 3rd 1 hr. Soak Cycle | 600 | |
| Brine-caustic - 30% Isopropanol | 3rd 1 hr. Soak Cycle | 1,180 | 97 |
| Resin B | | | |
| Brine-caustic control | 2nd 1 hr. Soak Cycle | 820 | |
| Brine-caustic - 25% Ethylene glycol | 2nd 1 hr. Soak Cycle | 1,000 | 22 |

Evaluation of Cleaning Agents for a Weak Base Anion Exchange Resin

A strong base anion resin of the quaternary amine type in the hydroxide form will exchange the hydroxide ions for the anions of strong and weak acids as well as for the anions of salts (salt-splitting). A weak base resin differs from the strong base in that the functional group usually consists of a primary, secondary, or tertiary amine, which bears a charge due to the acidic effluent of the cation exchange resin. The weak base resin will not remove the anions of weak acids or salts from solution. The weak base resins remove the anions of strong mineral acids and organics from solution. The weak base resin is less prone to fouling from organics than is the strong base resin and consequently precedes (protects) the strong base anion exchange in an ion exchange train. It is also familiar to those skilled in the art that brine may not be required to enhance caustic cleaning. Table III gives the test results for several resin cleaning materials of the present invention as contrasted to certain of the surfactants of the type disclosed in U.S. Pat. No. 3,748,285 (Wiltsey, et. al.). Although certain of the ethoxylate phenol type surfactants increased effluent TOC content, these materials produce excessive foam and would therefore likely cause foaming problems and would probably lead to long rinse times between the resin cleaning and regeneration cycles.

TABLE III

| Sample | Test Conditions | TOC (ppm) | % Increase In Efficacy |
|---|---|---|---|
| 1% NaOH - control | 1 hr. - Room Temperature | 322 | — |
| 10% Ethoxylated octyl phenol | | 396 | 23 |
| 10% Ethlyene glycol | | 340 | 6 |
| 10% Ethoxylated nonyl phenol | | 396 | 23 |
| 1% NaOH - control | 1st 1 hr. Soak Discarded cleansers added to 2nd 1 hr. test | 56 | — |
| 10% Ethoxylated octyl phenol | | 110 | 96 |
| 10% Ethylene glycol | | 64 | 14 |
| 10% Ethoxylated nonyl phenol | | 110 | 96 |
| 1% NaOH - control | Same | 56 | — |
| 10% Ethoxylated octyl phenol (9 E.O.) | | 84 | 50 |
| 10% Ethoxylated octyl phenol (9.5 E.O.) | | 90 | 61 |
| 10% Ethoxylated octyl phenol (10-11 E.O.) | | 80 | 43 |
| 10% Ethoxylated octyl phenol (12 E.O.) | | 80 | 43 |
| 10% Ethoxylated octyl phenol (20 E.O.) | | 76 | 36 |

TABLE III-continued

| Sample | Test Conditions | TOC (ppm) | % Increase In Efficacy |
| --- | --- | --- | --- |
| 1% NaOH - control | Same | 40 | — |
| 10% Complex phosphate esters | | 56 | 40 |
| 10% Complex phosphate esters | | 60 | 50 |
| 1% NaOH - control | Same | 38 | — |
| 30% Isopropyl alcohol | | 78 | 105 |
| 30% Ethylene glycol | | 40 | — |

Test conditions—50 gms fouled weak base anionic resin. 100 mls test solution—room temperature.

DISCUSSION

The results reported in Table I indicate that at 1% concentration levels, ethylene glycol is comparable to the prior art alkyl ethoxylated phenol surfactants in effluent TOC determination. However, a 10% concentration of ethylene glycol performed better than any of the materials tested in Table I.

In Table II, the percentage increase in cleaning efficacy is shown for both isopropanol and ethylene glycol. Upon use of a 30% concentration of isopropanol, 100% and 97% increases in cleansing action over the control samples were noted. The use of isopropanol in about a 30 wt % aqueous solution is therefore preferred.

In weak base anion resin cleaning tests, isopropanol far outperformed the ethoxylated alkyl phenol surfactants.

It can thus be seen that the disclosed invention carries out the objects of the invention set forth above. In accord with the patent statutes, the best mode has been set forth. However, it will be apparent to those skilled in the art that many other modifications can be made without departing from the invention herein disclosed and described, the scope of the invention being limited only by the scope of the attached claims.

We claim:

1. In a method of removing organic foulants selected from the group consisting of humic acids, lignins, and tannins from anionic exchange resin beads wherein said foulants have coated the resin beads and have blocked or entered the pores thereof, and wherein said fouled resin is treated with a member or members selected from the group consisting of brine and caustic to aid in removal of said foulants, the improvement comprising also contacting said fouled resin with an aqueous solution comprising consisting essentially of an effective cleaning agent having the formula:

$$R-O-H$$

wherein R is alkyl ($C_1$–$C_4$).

2. An improved method as defined in claim 1 wherein said cleaning agent is present in said aqueous solution in an amount of from about 0.1–50% (wt).

3. An improved method as defined in claim 1 wherein said anionic exchange resin comprises a strong base anionic exchange resin.

4. An improved method as defined in claim 1 wherein said cleaning agent is isopropyl alcohol.

5. An improved method as defined in claim 4 wherein said aqueous solution contains about 30% (wt) of said isopropyl alcohol.

6. An improved method as defined in claim 1 wherein said anionic exchange resin comprises a weak base anionic exchange resin.

* * * * *